US012397817B2

(12) United States Patent
Huang et al.

(10) Patent No.: US 12,397,817 B2
(45) Date of Patent: Aug. 26, 2025

(54) REPRESENTATION LEARNING FOR OBJECT DETECTION FROM UNLABELED POINT CLOUD SEQUENCES

(71) Applicants: TOYOTA RESEARCH INSTITUTE, INC., Los Altos, CA (US); MASSACHUSETTS INSTITUE OF TECHNOLOGY, Cambridge, MA (US)

(72) Inventors: Xiangru Huang, Quincy, MA (US); Yue Wang, Cambridge, MA (US); Vitor Guizilini, Santa Clara, CA (US); Rares Andrei Ambrus, San Francisco, CA (US); Adrien David Gaidon, San Jose, CA (US); Justin Solomon, Somerville, MA (US)

(73) Assignees: TOYOTA RESEARCH INSTITUTE, INC., Los Altos, CA (US); TOYOTA JIDOSHA KABUSHIKI KAISHA, Aichi-Ken (JP); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 394 days.

(21) Appl. No.: 17/859,945

(22) Filed: Jul. 7, 2022

(65) Prior Publication Data

US 2024/0010225 A1 Jan. 11, 2024

(51) Int. Cl.
*G06V 20/00* (2022.01)
*B60W 60/00* (2020.01)
*G06V 20/58* (2022.01)

(52) U.S. Cl.
CPC .......... *B60W 60/001* (2020.02); *G06V 20/58* (2022.01); *B60W 2420/403* (2013.01); *B60W 2420/408* (2024.01); *B60W 2554/4049* (2020.02)

(58) Field of Classification Search
CPC ........ B60W 60/001; B60W 2420/403; B60W 2420/408; B60W 2554/4049; B60W 2554/404; G06V 20/58; G06V 10/757
See application file for complete search history.

(56) References Cited

U.S. PATENT DOCUMENTS

| 10,809,361 | B2 | 10/2020 | Vallespi-Gonzalez et al. |
| 2020/0320867 | A1* | 10/2020 | Lewis ................. G08G 1/0133 |

(Continued)

FOREIGN PATENT DOCUMENTS

| RU | 2016145126 A | 5/2018 |
| WO | 2016170333 A1 | 10/2016 |

OTHER PUBLICATIONS

Luo, et al., "Self-Supervised Pillar Motion Learning for Autonomous Driving," https://arxiv.org/abs/2104.08683, submitted on Apr. 18, 2021.

(Continued)

*Primary Examiner* — Ping Y Hsieh
(74) *Attorney, Agent, or Firm* — SEYFARTH SHAW LLP

(57) ABSTRACT

A method of representation learning for object detection from unlabeled point cloud sequences is described. The method includes detecting moving object traces from temporally-ordered, unlabeled point cloud sequences. The method also includes extracting a set of moving objects based on the moving object traces detected from the sequence of temporally-ordered, unlabeled point cloud sequences. The method further includes classifying the set of moving objects extracted from on the moving object traces detected from the sequence of temporally-ordered, unlabeled point cloud sequences. The method also includes estimating 3D bounding boxes for the set of moving objects based on the classifying of the set of moving objects.

20 Claims, 9 Drawing Sheets

(56) References Cited

U.S. PATENT DOCUMENTS

| | | | |
|---|---|---|---|
| 2022/0153297 A1* | 5/2022 | Chen | G01S 17/34 |
| 2023/0271607 A1* | 8/2023 | Kobashi | G01S 17/89 |
| | | | 701/41 |
| 2023/0271616 A1* | 8/2023 | Kobashi | G06V 20/56 |
| | | | 356/4.01 |

OTHER PUBLICATIONS

Lee, et al., "PillarFlow: End-to-end Birds-eye-view Flow Estimation for Autonomous Driving," IEEE/RSJ International Conference on Intelligent Robots and Systems, pp. 2007-2013, Oct. 24, 2020-Jan. 24, 2021.
Qi, et al., "Offboard 3D Object Detection from Point Cloud Sequences," 2021 IEEE/CVF Conference on Computer Vision and Pattern Recognition (CVPR), pp. 6130-6140, 2021.
Chen, et al., "Moving Object Segmentation in 3D LiDAR Data: A Learning-based Approach Exploiting Sequential Data," IEEE Robotics and Automation Letters, vol. 6, No. 4, pp. 6529-6536, Oct. 2021.
Yang, et al., "IPOD: Intensive Point-based Object Detector for Point Cloud," https://arxiv.org/abs/1812.05276, submitted on Dec. 13, 2018.

* cited by examiner

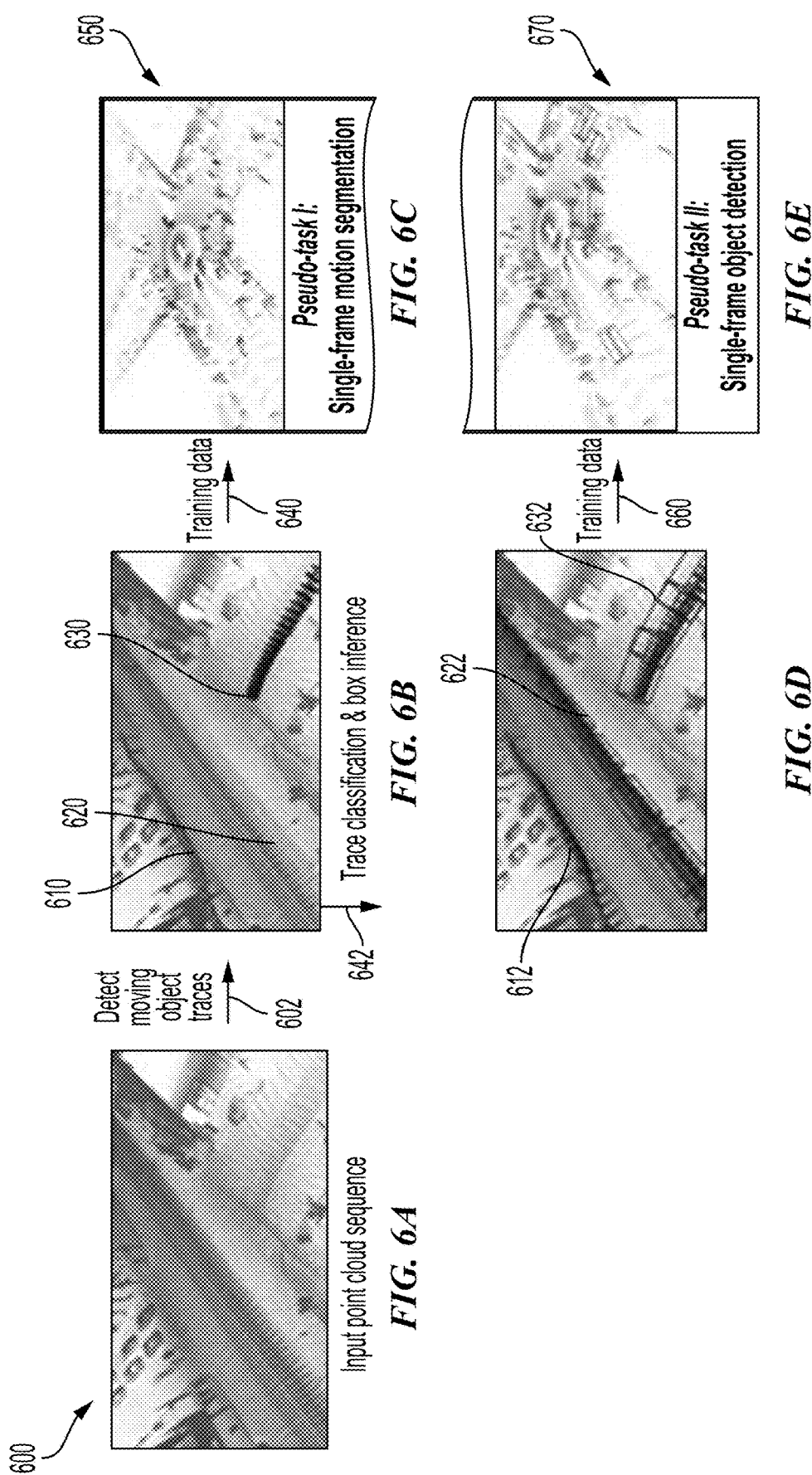

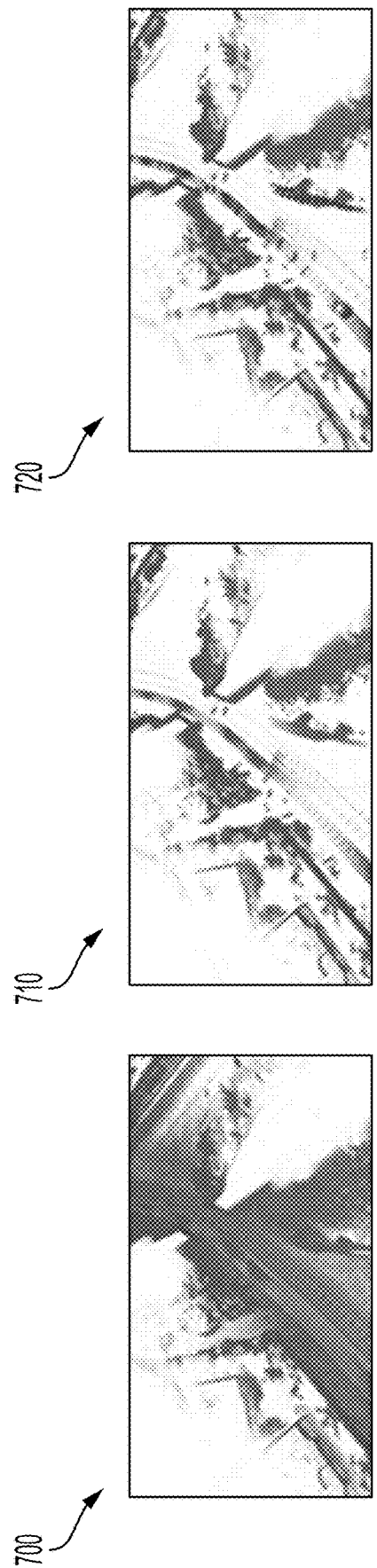
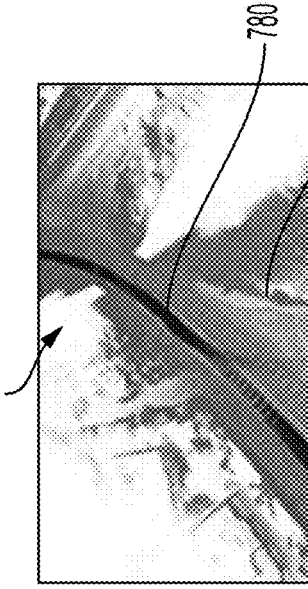
FIG. 7A (a) Input Point Cloud Sequence
FIG. 7B (b) Ground Removal
FIG. 7C (c) Object Cluster Proposal
FIG. 7D (d) Trace Detection
FIG. 7E (e) Ground Truth Objects

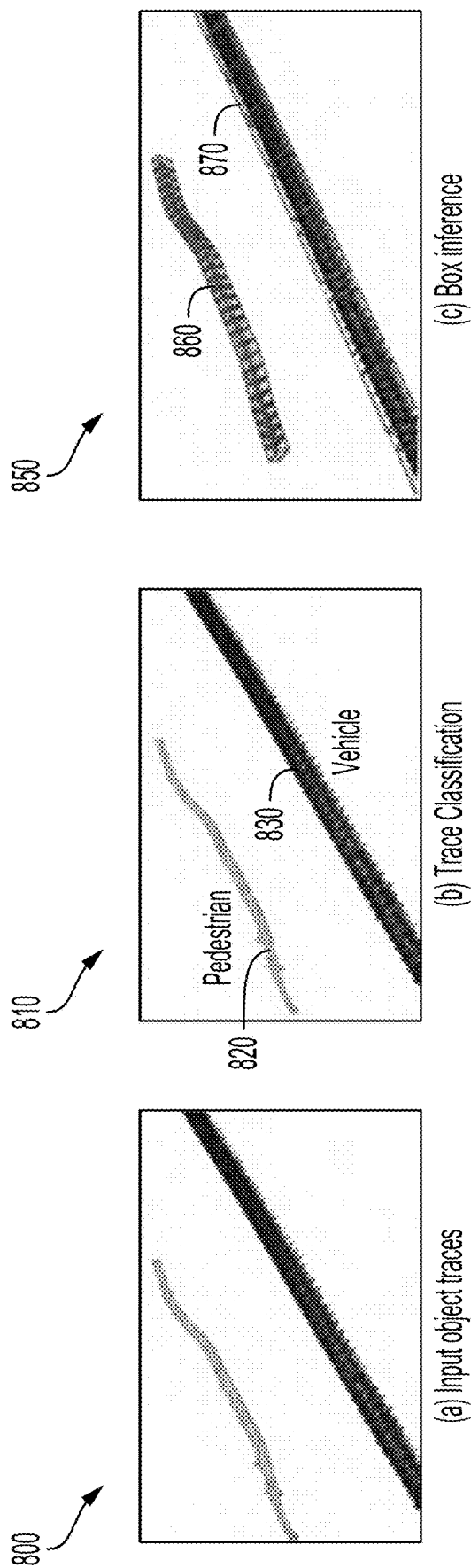

REPRESENTATION LEARNING FOR OBJECT DETECTION FROM UNLABELED POINT CLOUD SEQUENCES

BACKGROUND

Field

Certain aspects of the present disclosure generally relate to machine learning and, more particularly, a system and method for representation learning for object detection from unlabeled point cloud sequences.

Background

Autonomous agents rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

Autonomous agents may rely on a trained convolutional neural network (CNN) to identify objects within areas of interest in an image of a surrounding scene of the autonomous agent. For example, a CNN may be trained to identify and track objects captured by sensors, such as light detection and ranging (LIDAR) sensors, sonar sensors, red-green-blue (RGB) cameras, RGB-depth (RGB-D) cameras, and the like. The sensors may be in communication with a device, such as an autonomous vehicle for collecting unlabeled 3D data.

Although this unlabeled 3D data is easy to collect, state-of-the-art machine learning techniques for 3D object detection still rely on difficult-to-obtain manual annotations. To reduce this dependence on the expensive and error-prone process of manual labeling, a technique for representation learning from unlabeled LIDAR point cloud sequences is desired.

SUMMARY

A method of representation learning for object detection from unlabeled point cloud sequences is described. The method includes detecting moving object traces from temporally-ordered, unlabeled point cloud sequences. The method also includes extracting a set of moving objects based on the moving object traces detected from the sequence of temporally-ordered, unlabeled point cloud sequences. The method further includes classifying the set of moving objects extracted from on the moving object traces detected from the sequence of temporally-ordered, unlabeled point cloud sequences. The method also includes estimating 3D bounding boxes for the set of moving objects based on the classifying of the set of moving objects.

A non-transitory computer-readable medium having program code recorded thereon for representation learning and object detection from unlabeled point cloud sequences is described. The program code being executed by a processor. The non-transitory computer-readable medium includes program code to detect moving object traces from temporally-ordered, unlabeled point cloud sequences. The non-transitory computer-readable medium also includes program code to extract a set of moving objects based on the moving object traces detected from the sequence of temporally-ordered, unlabeled point cloud sequences. The non-transitory computer-readable medium further includes program code to classify the set of moving objects extracted from on the moving object traces detected from the sequence of temporally-ordered, unlabeled point cloud sequences. The non-transitory computer-readable medium also includes program code to estimate 3D bounding boxes for the set of moving objects based on the classifying of the set of moving objects.

A system of representation learning for object detection from unlabeled point cloud sequences is described. The system includes a moving object trace detection module to detect moving object traces from temporally-ordered, unlabeled point cloud sequences. The system also includes a moving object extraction module to extract a set of moving objects based on the moving object traces detected from the sequence of temporally-ordered, unlabeled point cloud sequences. The system further includes an object classification and labeling module to classify the set of moving objects extracted from on the moving object traces detected from the sequence of temporally-ordered, unlabeled point cloud sequences. The system also includes a bounding box estimation module to estimate 3D bounding boxes for the set of moving objects based on the classifying of the set of moving objects.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 6A-6E are diagrams illustrating an overview of a self-supervised learning framework, in which moving objects detected from input point cloud sequences are used to train self-supervised tasks for feature extraction, according to aspects of the present disclosure.

FIGS. 7A-7E illustrate an overview of an input points cloud sequences during various stages of an object trace detection process, according to aspects of the present disclosure.

FIGS. 8A-8C are diagrams illustrating an overview of a bounding box inference step based on detected object traces and pseudo labels, according to aspects of the present disclosure.

DETAILED DESCRIPTION

Figure 1:
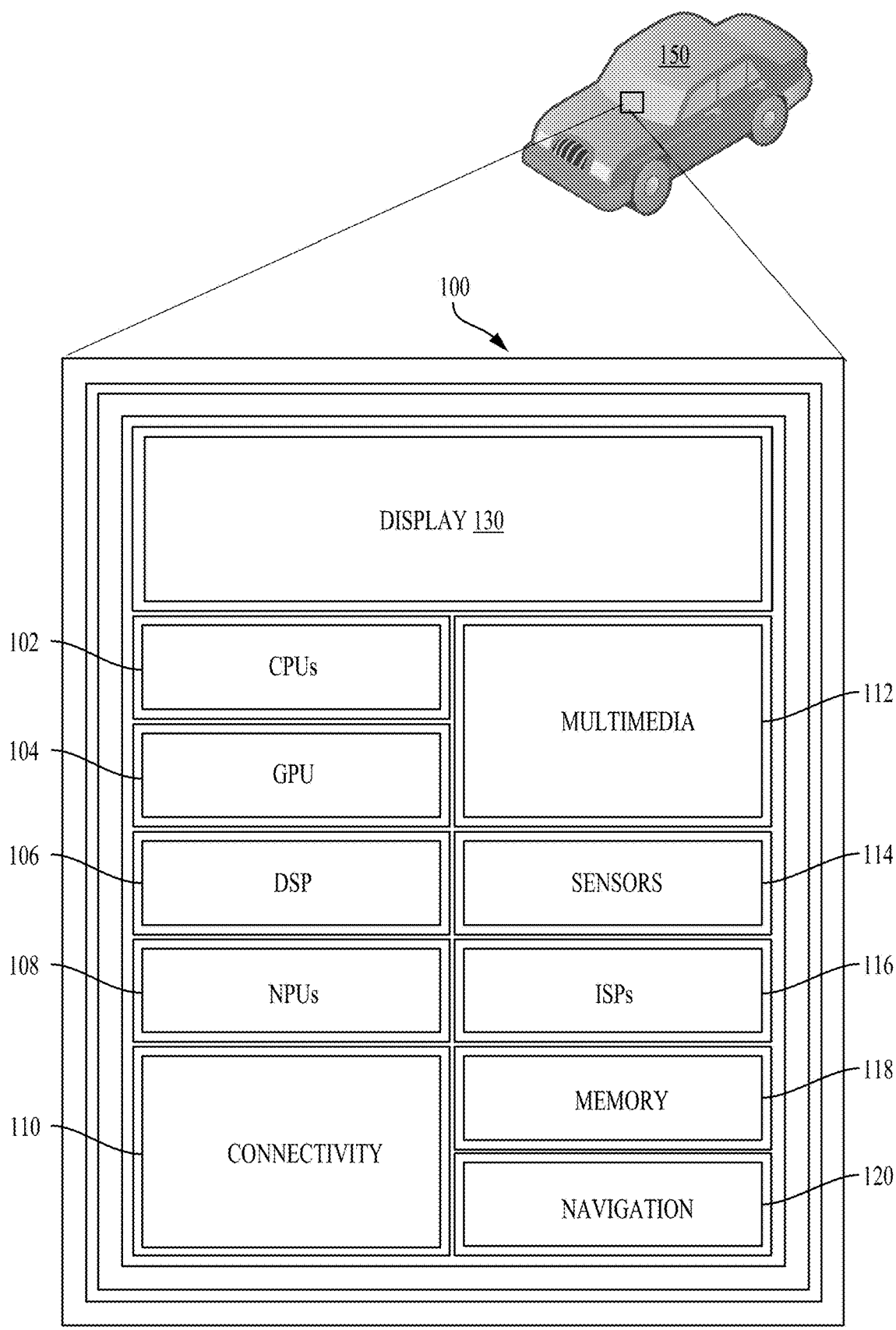
FIG. 1 illustrates an example implementation of designing a system using a system-on-a-chip (SOC) for representation learning and object detection from unlabeled point cloud sequences, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Autonomous agents may rely on a trained convolutional neural network (CNN) to identify objects within areas of interest in an image of a surrounding scene of the autonomous agent. For example, a CNN may be trained to identify and track objects captured by sensors, such as light detection and ranging (LIDAR) sensors, sonar sensors, red-green-blue (RGB) cameras, RGB-depth (RGB-D) cameras, and the like. The sensors may be in communication with a device, such as an autonomous vehicle for collecting unlabeled 3D data from which to perform object detection.

Among the modalities used for object detection during autonomous driving, LIDAR point clouds capture an accurate 3D scene structure, yielding state-of-the-art performance. Unfortunately, sparsity and irregularity of LIDAR point clouds may prohibit models from generalizing to complicated real-world environments. Moreover, successful object detection involves jointly solving several tasks, including foreground-background segmentation, instance segmentation, object localization, and classification. This results in a high demand for human labels of object locations, velocities, orientations, and other properties within unlabeled 3D data. That is, although unlabeled 3D data is trivial to collect, state-of-the-art machine learning techniques for 3D object detection rely on difficult-to-obtain manual annotations.

As opposed to highly expensive human-annotated labels, autonomous vehicles equipped with LIDAR sensors can readily collect unlabeled point cloud sequences whenever they are on the road. These temporally-ordered sequences contain more information than single-frame point clouds. Some aspects of the present disclosure are directed to representation learning from unlabeled LIDAR point cloud sequences. These aspects of the present disclosure recognize that moving objects are reliably detected from point cloud sequences without involving human-labeled 3D bounding boxes. For example, a set of moving objects from a single LIDAR frame extracted from a point cloud sequence provides sufficient supervision for single-frame object detection. These aspects of the present disclosure design appropriate pretext tasks to learn point cloud features that generalize to both moving and static unseen objects. These features are applied to object detection, which achieves strong performance on self-supervised representation learning and unsupervised object detection tasks.

Some aspects of the present disclosure are directed to a representation learning approach for learning features and object detection from unlabeled LIDAR point cloud sequences without 3D bounding box annotations. These aspects of the present disclosure provide generalization from limited labeled data that are combined with various geometry processing techniques to derive a pseudo-label generator with relatively few parameters. In operation, the pseudo-label generator ingests unlabeled point cloud sequences and produces annotations valuable for pretext tasks like motion segmentation and moving object detection. In some aspects of the present disclosure, the generated annotations are used to pre-train a single-frame feature extractor that is subsequently used for downstream tasks such as object detection. Beneficially, representation learning from unlabeled LIDAR point cloud sequences reduces dependence on the expensive and error-prone process of manual labeling.

FIG. 1 illustrates an example implementation of the aforementioned system and method for representation learning and object detection from unlabeled point cloud sequences using a system-on-a-chip (SOC) 100 of an ego vehicle 150. The SOC 100 may include a single processor or multi-core processors (e.g., a central processing unit (CPU)

102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize semantic keypoints of objects in an area of interest, according to the display 130 illustrating a view of a vehicle. In some aspects, the NPU 108 may be implemented in the CPU 102, DSP 106, and/or GPU 104. The SOC 100 may further include sensors 114, image signal processors (ISPs) 116, and/or navigation 120, which may, for instance, include a global positioning system (GPS).

The SOC 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100.

In this aspect of the present disclosure, instructions loaded into a processor (e.g., CPU 102) or the NPU 108 of the ego vehicle 150 may include code to perform representation learning for object detection from unlabeled point cloud sequences captured by the sensors 114 (e.g., a LIDAR sensor/camera). The instructions loaded into the NPU 108 may also include code to detect moving object traces from temporally-ordered, unlabeled point cloud sequences captured by the sensors 114. The instructions loaded into the NPU 108 may also include code to extract a set of moving objects based on the moving object traces detected from the sequence of temporally-ordered, unlabeled point cloud sequences. The instructions loaded into the NPU 108 may also include code to classify the set of moving objects extracted from on the moving object traces detected from the sequence of temporally-ordered, unlabeled point cloud sequences. The instructions loaded into the NPU 108 may further include code to estimate 3D bounding boxes for the set of moving objects based on the classifying of the set of moving objects.

Figure 2:
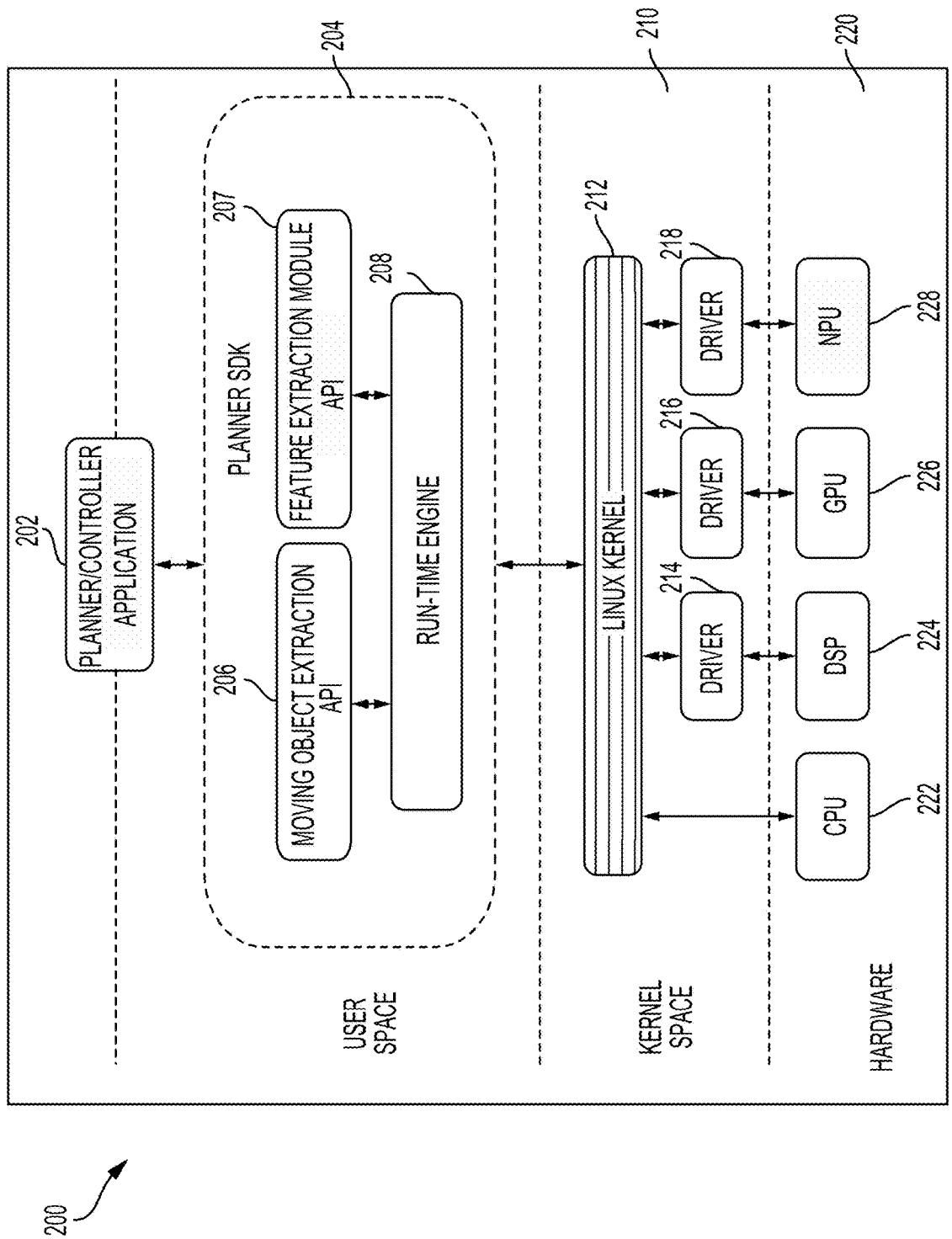
FIG. 2 is a block diagram illustrating a software architecture that may modularize functions for representation learning and object detection from unlabeled point cloud sequences, according to aspects of the present disclosure.

FIG. 2 is a block diagram illustrating a software architecture 200 that may modularize functions for representation learning and object detection from unlabeled point cloud sequences, according to aspects of the present disclosure. Using the architecture, a planner/controller application 202 is designed to cause various processing blocks of a system-on-a-chip (SOC) 220 (for example a CPU 222, a DSP 224, a GPU 226, and/or an NPU 228) to perform supporting computations during run-time operation of the planner/controller application 202.

The planner/controller application 202 may be configured to call functions defined in a user space 204 that may, for example, provide for representation learning and object detection from unlabeled point cloud sequences in frames captured by a LIDAR camera of an ego vehicle. The planner/controller application 202 may make a request to compile program code associated with a library defined in a moving object extraction application programming interface (API) 206 for detection and extraction of moving objects from unlabeled point cloud sequences, which enables self-supervised representation learning from point cloud data. The planner/controller application 202 may make a request to compile program code associated with a library defined in a feature extraction module API 207 for the task of extracting a feature vector from unlabeled point cloud sequences of frames captured by a LIDAR camera of an autonomous agent. The planner/controller application 202 may configure a vehicle control action by planning a trajectory of the ego vehicle according to objects within a scene surrounding the ego vehicle detected from the feature vectors.

A run-time engine 208, which may be compiled code of a runtime framework, may be further accessible to the planner/controller application 202. The planner/controller application 202 may cause the run-time engine 208, for example, to perform tracking of moving objects in subsequent point cloud sequences of a LIDAR camera stream. When an object is detected within a predetermined distance of the ego vehicle, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
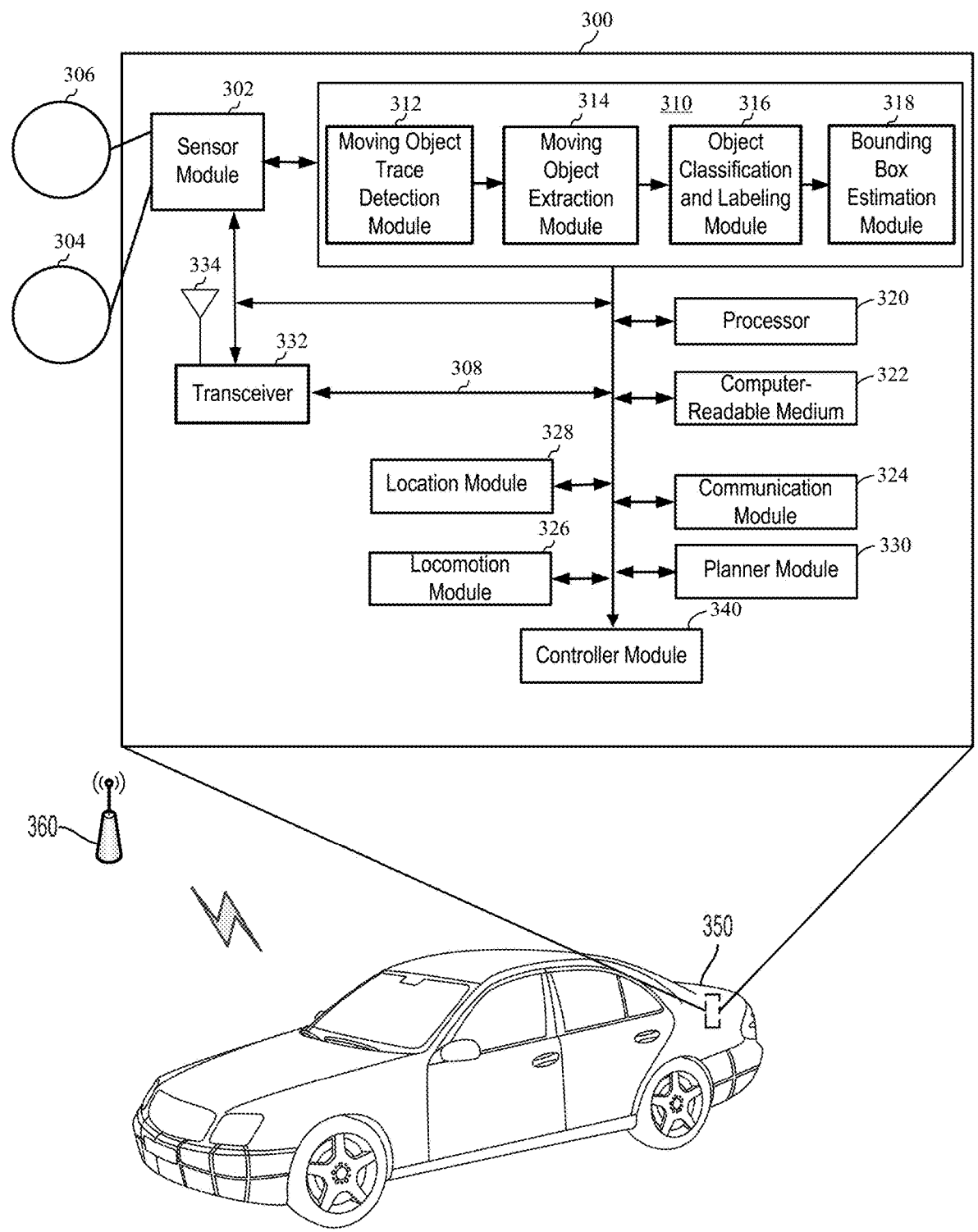
FIG. 3 is a diagram illustrating an example of a hardware implementation for a representation learning and object detection system for 3D bounding box estimation from unlabeled point cloud sequences, according to aspects of the present disclosure.

FIG. 3 is a diagram illustrating an example of a hardware implementation for a representation learning and object detection system 300 for 3D bounding box estimation from unlabeled point cloud sequences, according to aspects of the present disclosure. The representation learning and object detection system 300 may be configured for planning and control of an ego vehicle in response to detected objects in point cloud sequences from a LIDAR camera during operation of a car 350. The representation learning and object detection system 300 may be a component of a vehicle, a robotic device, or other device. For example, as shown in FIG. 3, the representation learning and object detection system 300 is a component of the car 350. Aspects of the present disclosure are not limited to the representation learning and object detection system 300 being a component of the car 350, as other devices, such as a bus, motorcycle, or other like vehicle, are also contemplated for using the representation learning and object detection system 300. The car 350 may be autonomous or semi-autonomous.

The representation learning and object detection system 300 may be implemented with an interconnected architecture, represented generally by an interconnect 308. The interconnect 308 may include any number of point-to-point interconnects, buses, and/or bridges depending on the specific application of the representation learning and object detection system 300 and the overall design constraints of the car 350. The interconnect 308 links together various circuits including one or more processors and/or hardware modules, represented by a sensor module 302, an ego perception module 310, a processor 320, a computer-readable medium 322, communication module 324, a locomotion module 326, a location module 328, a planner module 330, and a controller module 340. The interconnect 308 may also link various other circuits such as timing sources, peripherals, voltage regulators, and power management circuits, which are well known in the art, and therefore, will not be described any further.

The representation learning and object detection system 300 includes a transceiver 332 coupled to the sensor module 302, the ego perception module 310, the processor 320, the computer-readable medium 322, the communication module 324, the locomotion module 326, the location module 328, a planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit the pseudo-labeled point cloud sequences and/or planned actions from the ego perception module 310 to a server (not shown).

The representation learning and object detection system 300 includes the processor 320 coupled to the computer-readable medium 322. The processor 320 performs processing, including the execution of software stored on the computer-readable medium 322 to provide representation learning and object detection functionality based on unlabeled point cloud sequences, according to aspects of the present disclosure. The software, when executed by the processor 320, causes the representation learning and object detection system 300 to perform the various functions described for ego vehicle perception based on object detection from pseudo labeled point cloud sequences captured by a LIDAR camera of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing 2D RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306.

The images of the first sensor 304 and/or the second sensor 306 may be processed by the processor 320, the sensor module 302, the ego perception module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, detected 3D object information captured by the first sensor 304 and/or the second sensor 306 may be transmitted via the transceiver 332. The first sensor 304 and the second sensor 306 may be coupled to the car 350 or may be in communication with the car 350.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication—Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A DSRC-compliant GPS unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the parking space of the car 350. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, 5G new radio (NR), long term evolution (LTE), 3G, etc. The communication module 324 may also communicate with other components of the car 350 that are not modules of the representation learning and object detection system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include third generation (3G), fourth generation (4G), fifth generation (5G), long term evolution (LTE), LTE-vehicle-to-everything (V2X), LTE-driver-to-driver (D2D), Voice over LTE (VoLTE), or any other mobile data network or combination of mobile data networks. Further, the network access point 360 may include one or more IEEE 802.11 wireless networks.

The representation learning and object detection system 300 also includes the planner module 330 for planning a selected route/action (e.g., collision avoidance) of the car 350 and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and an HAV.

The ego perception module 310 may be in communication with the sensor module 302, the processor 320, the computer-readable medium 322, the communication module 324, the locomotion module 326, the location module 328, the planner module 330, the transceiver 332, and the controller module 340. In one configuration, the ego perception module 310 receives sensor data from the sensor module 302. The sensor module 302 may receive the sensor data from the first sensor 304 and the second sensor 306. According to aspects of the present disclosure, the ego perception module 310 may receive sensor data directly from the first sensor 304 or the second sensor 306 to perform monocular ego-motion estimation from images captured by the first sensor 304 or the second sensor 306 of the car 350.

Among the modalities used for object detection during autonomous driving, LIDAR point clouds capture an accurate 3D scene structure, yielding state-of-the-art performance. Unfortunately, sparsity and irregularity of LIDAR point clouds may prohibit models from generalizing to complicated real-world environments. Moreover, successful object detection involves jointly solving several tasks, including foreground-background segmentation, instance segmentation, object localization, and classification. This results in a high demand for human labels of object locations, velocities, orientations, and other properties within unlabeled 3D data. That is, although unlabeled 3D data is trivial to collect, state-of-the-art machine learning techniques for 3D object detection rely on difficult-to-obtain manual annotations.

As opposed to highly expensive human-annotated labels, autonomous vehicles equipped with LIDAR sensors, such as the first sensor 304 and/or the second sensor 306, can readily collect unlabeled point cloud sequences while on the road. These temporally-ordered sequences generally contain more information than single-frame point clouds. Some aspects of the present disclosure are directed to representation learning from these unlabeled point cloud sequences. These aspects of the present disclosure recognize that moving objects are reliably detected from point cloud sequences without relying on human-labeled 3D bounding boxes.

In some aspects of the present disclosure, a set of moving objects of a single LIDAR frame extracted from a point cloud sequence provides sufficient supervision for training single-frame object detection. These aspects of the present disclosure design appropriate pretext tasks to learn point cloud features that generalize to both moving and static unseen objects in the point cloud sequences. These learned point cloud features are applied to object detection in the form of pseudo labels. Object detection based on the pseudo labels achieves strong performance on self-supervised representation learning and unsupervised object detection tasks.

Some aspects of the present disclosure are directed to a representation learning approach for learning features for object detection from unlabeled LIDAR point cloud sequences without 3D bounding box annotations. These aspects of the present disclosure provide generalization from limited labeled data that are combined with various geometry processing techniques to derive a pseudo-label generator with relatively few parameters. In operation, the pseudo-label generator ingests unlabeled point cloud sequences and produces annotations valuable for pretext tasks like motion segmentation and moving object detection. In some aspects of the present disclosure, the generated annotations are used to pre-train a single-frame feature extractor that is subsequently used for downstream tasks such as object detection. Beneficially, representation learning from unlabeled LIDAR point cloud sequences reduces dependence on the expensive and error-prone process of manual labeling.

As shown in FIG. 3, the ego perception module 310 includes a moving object trace detection module 312, a moving object extraction module 314, an object classification and labeling module 316, and a bounding box estimation module 318. The moving object trace detection module 312, the moving object extraction module 314, the object classification and labeling module 316, and the bounding box estimation module 318 may be components of a same or different artificial neural network. For example, the artificial neural network is a convolutional neural network (CNN) communicably coupled to a LIDAR camera. The ego perception module 310 receives unlabeled point cloud sequences from the first sensor 304 and/or the second sensor 306. In one configuration, the first sensor 304 and the second sensor 306 are configured as a LIDAR camera sensor.

The ego perception module 310 is configured to perform 3D bounding box estimation from unlabeled point cloud sequences, according to aspects of the present disclosure. In this aspect of the present disclosure, the moving object trace detection module 312 is configured to detect moving object traces from temporally-ordered, unlabeled point cloud sequences captured by the first sensor 304 and/or the second sensor 306. In response, the moving object extraction module 314 is configured to extract a set of moving objects based on the moving object traces detected from the sequence of temporally-ordered, unlabeled point cloud sequences from the sensor module 302. Next, the object classification and labeling module 316 is configured to classify the set of moving objects extracted from on the moving object traces detected from the sequence of temporally-ordered, unlabeled point cloud sequences.

In some aspects of the present disclosure, the object classification and labeling module 316 is configured as a pseudo-label generator to provide pseudo labels to the set of moving objects based on the classification (e.g., vehicle, pedestrian, or cyclist). Based on the pseudo labels, the bounding box estimation module 318 is configured to estimate 3D bounding boxes for the set of moving objects based on the pseudo labels on the set of moving objects. The representation learning and object detection system 300 may be configured for planning and control of an ego vehicle based on detected objects according to 3D bounding boxes estimated from pseudo labels of point cloud sequences from LIDAR camera sensors during operation of an ego vehicle, for example, as shown in FIG. 4.

Figure 4:
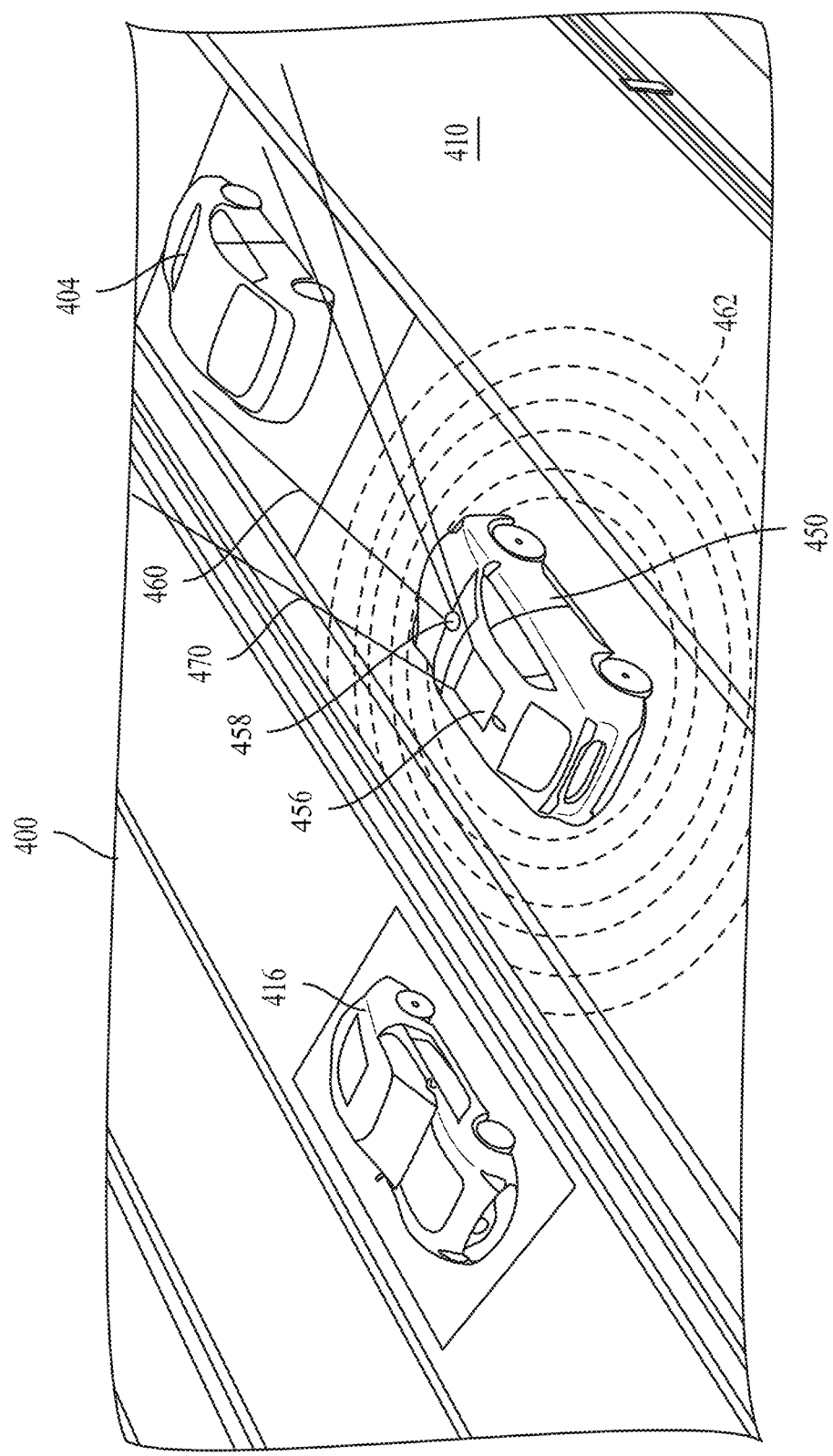
FIG. 4 is a drawing illustrating an example of an ego vehicle in an environment, according to aspects of the present disclosure.

FIG. 4 illustrates an example of an ego vehicle 450 (e.g., the car 350) in an environment 400, according to aspects of the present disclosure. As shown in FIG. 4, the ego vehicle 450 is traveling on a road 410. A first vehicle 404 (e.g., other agent) may be ahead of the ego vehicle 450, and a second vehicle 416 may be adjacent to the ego vehicle 450. In this example, the ego vehicle 450 may include a 2D camera 456, such as a 2D red-green-blue (RGB) camera, and a light detection and ranging (LIDAR) camera 458. Alternatively, the LIDAR camera 458 may be another RGB camera or another type of sensor, such as ultrasound, and/or a radio detection and ranging (RADAR) sensor, as shown by reference number 462. Additionally, or alternatively, the ego vehicle 450 may include one or more additional sensors. For example, the additional sensors may be side facing and/or rear facing sensors.

In one configuration, the 2D camera 456 captures a 2D image that includes objects in the field of view 460 of the 2D camera 456. The LIDAR camera 458 may generate LIDAR point cloud sequences. The LIDAR point cloud sequences captured by the LIDAR camera 458 may include a 3D point cloud of the first vehicle 404, as the first vehicle 404 is in the field of view 470 of the LIDAR camera 458. A field of view 460 of the 2D camera 456 is also shown.

The information obtained from the 2D camera 456 and the LIDAR camera 458 may be used to navigate the ego vehicle 450 along a route when the ego vehicle 450 is in an autonomous mode. The 2D camera 456 and the LIDAR camera 458 may be powered from electricity provided from the battery (not shown) of the ego vehicle 450. The battery may also power the motor of the ego vehicle 450. The information obtained from the LIDAR camera 458 may be used to estimate bounding boxes using self-supervised learning based on detected object traces within LIDAR point clouds.

Among the modalities used for object detection during autonomous driving of the ego vehicle, the LIDAR point clouds from the LIDAR sensor capture an accurate 3D scene structure surrounding the ego vehicle. Unfortunately, sparsity and irregularity of LIDAR point clouds may prohibit models from generalizing to complicated real-world environments. Moreover, successful object detection involves jointly solving several tasks, including foreground-background segmentation, instance segmentation, object localization, and classification. This results in a high demand for human labels of object locations, velocities, orientations, and other properties within unlabeled 3D data. That is, although unlabeled 3D data is trivial to collect, state-of-the-art machine learning techniques for 3D object detection rely on difficult-to-obtain manual annotations.

As opposed to highly expensive human-annotated labels, the ego vehicle 450, using the LIDAR camera 458, can readily collect unlabeled point cloud sequences while traveling on the road 410. Some aspects of the present disclosure are directed to representation learning from unlabeled LIDAR point cloud sequences captured by the LIDAR camera 458 of the ego vehicle 450. These aspects of the present disclosure recognize that moving objects are reliably detected from point cloud sequences without relying on human-labeled 3D bounding boxes. For example, object traces extracted from input point cloud sequences provide sufficient supervision for single-frame object detection. These aspects of the present disclosure learn point cloud features that generalize to both moving and static unseen objects using supervision based on a set of moving objects from a single LIDAR frame, for example, as shown in FIG. 5.

Figure 5:
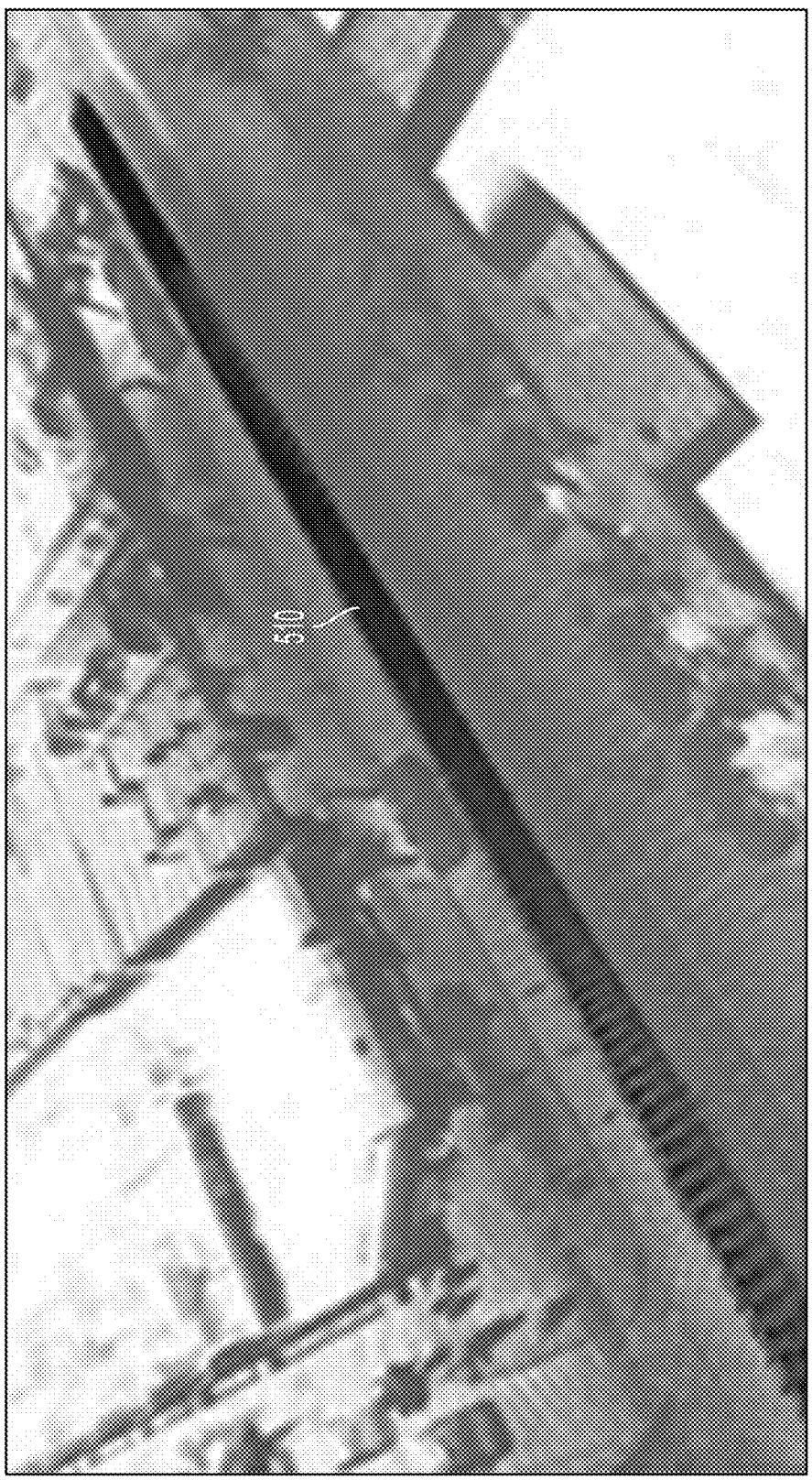
FIG. 5 is a diagram of an object trace detected from temporally-ordered, unlabeled point cloud sequences, according to aspects of the present disclosure.

FIG. 5 is a diagram 500 of an object trace 510 detected from temporally-ordered, unlabeled point cloud sequences, according to aspects of the present disclosure. As described, an object trace is a sequence of point clusters that move along smooth trajectories. As described, an object trace may be classified as moving or non-moving, which the object trace may be referred to as a moving object trace. In this example, the object trace 510 is a moving vehicle. In some aspects of the present disclosure, object traces may be classified and labeled to enable bounding box estimation.

In some aspects of the present disclosure a pseudo-label generator identifies moving objects represented as sequences of point clusters across frames, such as the object trace 510 shown in FIG. 5. These aspects of the present disclosure are directed to single-frame LIDAR point cloud segmentation methods that estimate motion and planar structures from each point cloud sequence. This information enables reliable separation of moving objects, resulting in a highly-accurate moving object detection technique. By combining all detected point clusters in the sequence, the location, orientation, and category of each moving object instance are estimated, enabling pretext tasks like moving object detection. To promote generalization and mitigate the bias of working exclusively with moving objects, estimated object labels are propagated to static objects. This propagation checks the consistency of predicted object labels across adjacent frames to prune incorrect predictions, which further improves the robustness of the label propagation to enable a self-supervised learning framework, for example, as shown in FIGS. 6A-6E.

FIGS. 6A-6E are diagrams illustrating an overview of a self-supervised learning framework, in which moving objects detected from input point cloud sequences are used to train self-supervised tasks for feature extraction, according to aspects of the present disclosure. FIG. 6A illustrates an input point cloud sequence 600, which may be captured using the LIDAR camera 458 of the ego vehicle 450, as shown in FIG. 4. FIGS. 6A-6E illustrate a process for representation learning for object detection from unlabeled point cloud sequences performed by a self-supervised learning framework, according to aspects of the present disclosure.

In some aspects of the present disclosure, the self-supervised learning framework shown in FIGS. 6A-6E operates by extracting a set of moving objects (e.g., defined below as detected object traces) from the sequence of temporally-ordered and unlabeled, input point cloud sequence 600, and training a feature extraction module via self-supervised tasks using the detected object traces. It should be recognized that the process of representation learning for object detection from unlabeled point cloud sequences is performed by a self-supervised learning framework that does not rely on human-labeled 3D bounding boxes at any stage of training.

FIG. 6B illustrates a first step 602 of the process of representation learning for object detection from unlabeled point cloud sequences, in which moving object traces are detected from the input point cloud sequence 600, according to aspects of the present disclosure. In this example, a first moving object trace 610, a second moving object trace 620, and a third moving object trace 630 are detected from the input point cloud sequence 600.

In these aspects of the present disclosure, detection of moving object traces is enabled by point cloud semantic segmentation. As described, point cloud semantic segmentation involves finding instances of objects, represented by sets of point cluster $\{C_i\}$ where $C_i \in \mathbb{R}^{M_i \times 3}$. In point cloud sequence data, object instances appear consistently in consecutive frames. Therefore, aspects of the present disclosure are directed to detecting object traces, which are described as sequences of point clusters across consecutive frames corresponding to the same object.

Formally, given a point cloud sequence $\mathcal{P} = \{P_1, \ldots, P_N\}$ where $P_t$ is the t-th frame from a LIDAR camera (e.g., the LIDAR camera 458), an object trace is a temporally-ordered sequence of clusters $\mathcal{C} = \{C_1, \ldots, C_r\}$, where $C_t \subseteq P_t$ for any $1 \leq l \leq t \leq r \leq N$. For example, FIG. 5 illustrates an object trace 510 detected from temporally-ordered, unlabeled point cloud sequences. The object trace 510 is a sequence of point clusters that move along smooth trajectories, which may be classified as moving or non-moving. In this example, the object trace 510 is a moving vehicle. Classification of the object trace 510 may provide a pseudo label of the object trace to enable bounding box estimation.

Aspects of the present disclosure recognize that many object classes relevant for autonomous driving are dynamic, including pedestrians, vehicles, and cyclists. Statistical analysis on the popular datasets shows that a large fraction of ground truth object traces follow smooth moving trajectories. In particular, the length and motion consistency of object traces reduce uncertainty in their detection, enabling a robust, non-learning object trace detection process for unlabeled point cloud sequences. In some aspects of the present disclosure, detected object traces are subsequently used to learn pseudo tasks in later stages.

As shown in FIG. 6B, detecting the object traces (e.g., the first moving object trace 610, the second moving object trace 620, and the third moving object trace 630) is inevitably disturbed by a number of factors, such as the interaction between objects and environment, the irregularity of motion, and different sampling density across frames. Even supervised methods suffer from such detection uncertainty. Aspects of the present disclosure focus on the object traces that move along smooth trajectories. Therefore, an object detector, such as a single-frame object detection model 670 shown in FIG. 6E, optimizes for detection precision instead of coverage. This choice may add a mild bias to the detected objects. For example, object velocities are recognized as independent from geometric appearance in optimizing for detection precision.

Some aspects of the present disclosure detect object traces by following a standard proposal-and-rejection framework. For each point cloud sequence, a candidate set of clusters corresponding to movable objects is proposed. Then, a Kalman filter is applied to acquire object traces according to their motion. Next, a subset of object traces with smooth trajectories is collected.

FIG. 6C illustrates a second step 640 for the process of representation learning for object detection from unlabeled point cloud sequences, in which detected moving object traces are used as training data, according to aspects of the present disclosure. Given a set of high-quality detected object traces (e.g., the first moving object trace 610, the second moving object trace 620, and the third moving object trace 630) extracted from unlabeled, input point cloud sequence 600, self-supervised tasks are designed for enabling representation learning of point cloud models.

As shown in FIG. 6C, a first pretext task trains a single-frame semantic instance segmentation model 650 to identify moving objects, according to aspects of the present disclosure. In these aspects of the present disclosure, ground truth may be computed by propagating detected object traces back into each frame. Nevertheless, training of the single-frame semantic instance segmentation model 650 does not use all information in the object traces, such as orientations inferred from objects' directions of motion, which provide a motivation for selecting more complex pretext tasks.

FIG. 6D illustrates a third step 642 for the process of representation learning for object detection from unlabeled point cloud sequences, in which detected moving object traces are classified and bounding box inference is performed, according to aspects of the present disclosure. Aspects of the present disclosure recognize that many object classes relevant for autonomous driving are dynamic, including pedestrians, vehicles, and cyclists. In this example, the first moving object trace 610 is classified as a pedestrian, while the second moving object trace 620, and the third moving object trace 630 are classified as moving vehicles.

In this aspect of the present disclosure, first bounding boxes 612 are estimated from the first moving object trace

610 based on the classification of the first moving object trace 610 as a pedestrian. In addition, second bounding boxes 622 are estimated from the second moving object trace 620 based on the classification of the second moving object trace 620 as a moving vehicle. Similarly, third bounding boxes 632 are estimated from the third moving object trace 630 based on the classification of the third moving object trace 630 as a moving vehicle. These bounding boxes may provide pseudo labels for training object detection, for example, as shown in FIG. 6E.

FIG. 6E illustrates a fourth step 660 for the process of representation learning for object detection from unlabeled point cloud sequences, in which estimated bounding boxes provide pseudo labels as training data for a single-frame object detection model 670, according to aspects of the present disclosure. These aspects of the present disclosure rely on object trace classification and bounding box inference to perform a second pretext task for training the single-frame object detection model 670 to detect 3D bounding boxes of objects in single-frame point clouds. Many attributes of the ground truth 3D bounding boxes can be inferred from detected object traces. Some aspects of the present disclosure perform self-supervision on these inferred attributes to boost performance of the representation learning process for object detection from unlabeled point cloud sequences.

FIGS. 7A-7E illustrate an overview of an input point cloud sequence during various stages of an object trace detection process, according to aspects of the present disclosure. In some aspects of the present disclosure, the object trace detection process shown in FIGS. 7A-7E involves three steps: (1) preprocessing, (2) object cluster proposal, and (3) object trace tracking. Some aspects of the present disclosure apply two preprocessing steps on each point cloud sequence input before passing it to a detection algorithm. FIG. 7A illustrates an input point cloud sequence 700 during an input point cloud stage of the object trace detection process, according to aspects of the present disclosure. As shown in FIG. 7A, a first preprocessing step of the object trace detection process brings all frames into a world coordinate system using an ego-motion provided, for example, as shown in FIGS. 3 and 4.

FIG. 7B illustrates the input point cloud sequence 700 of FIG. 7A during a ground removal stage of the object trace detection process, according to aspects of the present disclosure. As shown in FIG. 7B, a second preprocessing step removes points on the ground (e.g., ground points) of the input point cloud sequence 700 of FIG. 7A, which typically account for 50% to 90% of the total number of points for improving detection efficiency and robustness. In this example, the entire point cloud sequence instead of a single-frame point cloud is used to reconstruct the ground plane.

In some aspects of the present disclosure, removing points on the ground involves observing that the ground plane is a smooth surface that approximately aligns with the x-y plane. These aspects of the present disclosure solve an optimization problem to estimate the ground height $h_i$ at a set of 2D grid cells with centers $(x_i, y_i)$ on the x-y plane; this implementation uses a 1000×1000 grid. In this example, the height of the j-th input point is denoted as $z_j$, the set of points in grid cell i as $G_i$, and the neighboring cells of cell i as $\mathcal{N}_i$. The optimization problem is shown in Equation (1)

$$\min_h \sum_i \left[ \frac{1}{|G_i|} \sum_{j \in G_i} \max(h_i - z_j, 0) + \frac{\lambda}{2} \sum_{k \in N_i} (h_i - h_k)^2 \right]. \tag{1}$$

This example uses a piecewise-linear first term to tolerate noisy inputs. In addition Equation (1) is solved using gradient descent, with $\lambda=0.1$ and stopping condition $\|\Delta h\|_2 < 0.1$ m. Then, point $j \in G_i$ is removed if $z_j < h_i + \delta$; this experiment uses $\delta=0.5$ m. An example of a resulting point cloud 710 (e.g., a ground removed point cloud visualization) after ground plane removal is shown in FIG. 7B.

FIG. 7C illustrates the resulting point cloud 710 of FIG. 7B during an object cluster proposal stage of the object trace detection process, according to aspects of the present disclosure. Because object sizes may vary significantly across classes, aspects of the present disclosure rely on point cloud segmentation to extract point clusters that correspond to object instances. In this LIDAR point cloud segmentation method, a subset of point cloud segments are extracted that correspond to moving object instances.

Given a point cloud sequence, motion is used as a cue for segmentation. In this example, the velocity $v_i \in \mathbb{R}^3$ of each point $p_i$ is estimated and a pairwise proximity score $s_{ij}$ is computed according to Equation (2):

$$s_{ij} = \exp\left(-\frac{\|p_i - p_j\|^2}{\sigma_p^2} - \frac{\|v_i - v_j\|^2}{\sigma_v^2}\right), \tag{2}$$

where $\sigma_p=0.5$ m and $\sigma_v=0.5$ m/s. Next normalized cuts are run with edge weights $\{s_{ij}\}$ and clusters are selected with average velocity>0.1 m/s.

To compute motion estimates for providing object cluster proposals 720, one of two methods is applied to the resulting point cloud 710. A first method accommodates point cloud sequences by optimizing for a spatiotemporal velocity field $f_\theta: \mathbb{R}^4 \to \mathbb{R}^3$ mapping any point location $x \in \mathbb{R}^3$ together with time t to a velocity $v \in \mathbb{R}^3$. In this example, (x, t) is normalized into $[0,1]^4$ and network parameters $\theta$ are optimized over the chamfer distance between adjacent point cloud frames. A second method estimates scene flow between pairs of adjacent frames. In this second method, a model is trained via self-supervised learning. The pre-trained model may be applied to each pair of adjacent frames in the sequence.

TABLE 1

Object Trace Tracking Process
Algorithm 1 Object Trace Tracking from s-th to t-th frame.

Input: Point cloud sequence $\{P_i\}$, object cluster proposal
$C_S \subset P_S$, kalman filter KF, registration error threshold old
$\sigma_0$, acceleration threshold $\sigma_1$.
1. Initialize KF with state (avg($C_S$), 0).
2. $\mathcal{T} \leftarrow \{C_S\}$, $v^- \leftarrow 0$.
for i = s + 1 to t do
   3. C ← $C_{i+1}$ +KF.CurrentVelocity( ).
   # get deformed points, registration error
   4. $C_i$, σ ←Rigid-ICP(C, $P_i$)
   5. v ← avg($C_i$) − avg($C_{i-1}$)
   if $\|v - v^-\| > \sigma_1$ or $\sigma > \sigma_0$ then
     BREAK
   end if
   7. KF.UpdateState(avg($C_i$))
   8. $\mathcal{T} \leftarrow \mathcal{T} \cup \{C_i\}$, $v^- \leftarrow v$
end for
Output: $\mathcal{T}$ FIG. 7D illustrates the object cluster proposals 720 of FIG. 7C that serve as input to a trace detection stage of the object trace detection process, according to aspects of the present disclosure. Assuming each point cluster is rigidly transformed across different frames, a multi-object tracking process is adopted that uses Kalman filtering to track the motion of each of the object cluster proposals 720 of FIG. 7C. In this example, a Kalman filter (KF) is used to estimate the velocity of each object's center from a sequence of cluster centers. This object trace tracking process begins with the geometric center of the object cluster proposals 720 of FIG. 7C and zero velocity, and iteratively registers the object cluster to the adjacent frames according to the object trace tracking process shown in Table 1. In this aspect of the present disclosure, Table 1 illustrates pseudo code for the object trace tracking stage of the object trace detection process, according to aspects of the present disclosure. As shown in Table 1, two stopping conditions are used for trace tracking to reject large average registration errors and large acceleration magnitudes, with thresholds $\sigma_0=1.0$ m and $\sigma_1=3.0$ m/s$^2$. As shown in FIG. 7C, the object cluster proposals 720 are highlighted according to a shading pattern.

FIG. 7D illustrates detected object traces 750 following the trace detection step of the object trace detection process, according to aspects of the present disclosure. As shown in FIG. 7D, each of the detected object traces 750 is identified using a different shading. For each of the object cluster proposals 720 of FIG. 7C, the output of the object trace tracking process is a sequence of rigid transformations that transforms the cluster across frames. In some aspects of the present disclosure, points that are geometrically close to any of the transformed object cluster points are collected (e.g., within a distance r=0.3 m). If the points of two object traces overlap by at least a 10% intersection over union (IoU), the one with the smaller number of points is rejected.

FIG. 7E illustrates ground truth objects, according to aspects of the present disclosure. As shown in FIG. 7E, the ground truth object points 770 are visualized in these aspects of the present disclosure. In this example, a vehicle 780 is shaded in a first pattern, and a pedestrian 790 is shaded in a second pattern. According to aspects of the present disclosure, the detected object traces 750 and the ground truth object points 770 may provide training data for classification and a pseudo label of the detected object traces 750, for example, as shown in FIGS. 8A-8C.

Given a set of object traces corresponding to moving object instances in LIDAR point cloud sequences, aspects of the present disclosure provide self-supervised tasks that yield point cloud feature representations for downstream tasks, such as single-frame LIDAR object detection. Some aspects of the present disclosure introduce two self-supervised tasks for training a feature extractor with a single-frame point cloud input. Aspects of the present disclosure are also directed to a deep feature extraction module.

Aspects of the present disclosure consider motion segmentation as a first self-supervised task for training a motion segmentation model, such as the single-frame semantic instance segmentation model 650 shown in FIG. 6C. Because object traces are extracted with high precision, these object traces are used as segmentation masks to train a single-frame model (e.g., the single-frame semantic instance segmentation model 650) for differentiating moving objects from the background, according to aspects of the present disclosure. Some aspects of the present disclosure train a pointwise binary classifier that classifies each feature vector as either moving or non-moving. In one configuration, the classifier is implemented as a multi-layer perceptron (MLP) that combines a rectilinear unit (ReLU) layer and a batch normalization layer in a model architecture. In this configuration a negative log-likelihood is used as a training loss.

To generalize from moving to static objects, some aspects of the present disclosure augment each scene with randomly-sampled point clusters corresponding to moving objects from other scenes. For example, for each scene and each object class in {Vehicle, Pedestrian, Cyclist}, a predetermined number (e.g., 15 for Vehicle, 10 for Pedestrian and Cyclist) of point clusters are randomly selected and placed at random locations in the scene.

FIGS. 8A-8C are diagrams illustrating an overview of a bounding box inference step based on detected object traces and pseudo labels, according to aspects of the present disclosure. FIG. 8A illustrates input object traces 800, which may be detected as shown in FIGS. 7A-7D. This first self-supervised task is straightforward but fails to use all information in the detected object traces. For example, object orientations can be inferred from motion information but are ignored in this first self-supervised task. FIG. 8B illustrates a trace classification stage 810 of the bounding box inference stage, according to aspects of the present disclosure.

As shown in FIG. 8B, the input object traces 800 of FIG. 8A are classified as a pedestrian object trace 820 and a vehicle object trace 830. FIG. 8C illustrates a box inference stage 850 of the bounding box inference process, according to aspects of the present disclosure. As shown in FIG. 8C, 3D bounding boxes 860 of the pedestrian object trace 820 and 3D bounding boxes 870 of the vehicle object trace 830 are estimated from the class labels directly from each of the input object traces 800. In some aspects of the present disclosure, the pseudo labels of FIG. 8B and the estimated bounding boxes of FIG. 8C are used to train a 3D object detector. Some aspects of the present disclosure use a box regression component and a box regression and classification loss to estimate the 3D bounding boxes 860 of the pedestrian object trace 820 and 3D bounding boxes 870 of the vehicle object trace 830.

In some aspects of the present disclosure, estimating 3D bounding boxes used to train an object detector from object traces, such as the single-frame object detection model 670 shown in FIG. 6E involves the following subtasks:

(1) Registration: The velocity of each object cluster in each trace is estimated while enforcing smoothness. This enables approximate reconstruction of the object by incorporating geometry collected from multiple frames.

(2) Trace classification: Each object trace is categorized into one of the movable object classes (e.g., vehicle, pedestrian, or cyclist). This subtask involves labeled data.

(3) 3D bounding box estimation: Given estimated object class labels, 3D bounding boxes for each object class are estimated. The box size estimate is determined from densely reconstructed objects and is propagated to sparse objects in each single frame because the former provides high-confidence estimates. The end result of this procedure is a set of 3D bounding boxes that are used to train a single-frame object detector, such as the single-frame object detection model 670 shown in FIG. 6E, according to aspects of the present disclosure.

Regarding the registration subtask, as noted above, moving objects are observed to move along smooth trajectories. To improve robustness against irregular sampling sparsity of LIDAR point clouds, this smooth trajectory property is used to help estimate a velocity $v_i \in \mathbb{R}^3$ for each object cluster $C_i$ frame i of the trace. To this end, Equation (3) is optimized as follows:

$$\min_{v_i} \sum_{\substack{(i,j):\\|i-j|=1}} \left( \lambda \|v_i - v_j\|^2 + \sum_{p \in C_i} \frac{1}{|C_i|} \min_{q \in C_j} \|p + v_i - q\|^2 \right), \quad (3)$$

where λ is set to 1. The estimated velocities {$v_i$} bring all object points into the same coordinate system, forming a denser point cloud of the object instance, enabling object trace classification and 3D bounding box estimation.

Regarding the trace classification subtask, because object class labels are semantic rather than geometric, some minimal supervision is involved in distinguishing object classes (e.g., car, pedestrian, cyclist), as shown in FIG. 8B. This aspect of the present disclosure extracts ground truth object class labels for 10% of the object traces in the training dataset to train an object classifier that takes an object trace and outputs an object class label. An additional object class "Other" is included to deal with outliers. In some aspects of the present disclosure, an object trace classifier is configured as a point transformer, with 5 transition-down layers of dimension 32, 64, 128, 256, and 512, respectively. Each trace is represented as a 4D matrix with each row representing the location and time of a point.

Regarding the 3D bounding box estimation subtask, in LIDAR object detection, each 3D bounding box is represented by a 7-dimensional vector representing location, size, and orientation, for example, as shown in FIG. 8C. Because object sizes vary among classes, aspects of the present disclosure group object traces based on the estimated object class labels. For each object class, a fraction of objects is densely captured by a LIDAR sensor while the remaining points represent portions of the objects.

Some aspects of the present disclosure learn a model that regresses the bounding box size for each object trace, assuming the bounding box size does not change for each trace. For each class, this aspect of the present disclosure selects the top 20% of object traces ranked by number of points. These aspects of the present disclosure use the velocity computed in Equation (3) to bring all point clusters into the same coordinate system and compute a 3D bounding box that covers all points with minimal volume. The resulting bounding box size vectors are used to train a model that regresses bounding box size. These aspects of the present disclosure use the model to predict bounding box sizes from all other object traces. The model architecture and input data representation of the regression model are the same as in trace classification, for example, as shown in FIGS. 8B and 8C.

Given the bounding box size, some aspects of the present disclosure then solve an optimization problem to estimate box location and orientation:

$$\min_{b_i} \sum_{(i,j): |i-j|=1} d_1(b_i, b_j) + d_2(b_i, C_i). \quad (4)$$

where $b_i$ represents box attributes, $d_1$ penalizes the difference in orientation and enforces smoothness of box locations, and $d_2$ encourages the i-th box $b_i$ to cover the i-th point cluster $C_i$. Here the loss functions $d_1$ and $d_2$ are elaborated from (4). This example first unpacks the box attribute vector $b_i \in \mathbb{R}^7$ as $c_i \in \mathbb{R}^3$, $s_i \in \mathbb{R}^3$ and $\theta_i$, representing box center, box size, and orientation, respectively. Because the box size is fixed for each trace, $d_1$ is defined as $$d_1(b_i, b_j) = \gamma_1 \|c_i - c_j\|^2 + \|\sin(\theta_i) - \sin(\theta_j)\|^2 + \|\cos(\theta_i) - \cos(\theta_j)\|^2 \quad (5)$$

where $\gamma_1$ is set to 0.1.

For the definition of $d_2$, these aspects of the present disclosure define outward the normal vector $n_{i,1} \ldots n_{i,6}$ and face center $c_{i,1}, \ldots c_{i,6}$ for the faces of the 3D bounding box represented by $b_i$:

$$d_2(b_i, C_i) = \frac{\gamma_2}{|C_i|} \sum_{p \in C_i} \sum_{k=1}^{6} \max(\langle p - c_{i,k}, n_{i,k} \rangle, 0), \quad (6)$$

where $\gamma_2$ is set to 0.1 to make sure that this loss function can tolerate a small fraction of outlier points in the point clusters.

As the resulting 3D bounding boxes are limited to representing moving objects in each point cloud sequence, some aspects of the present disclosure involve moving-to-static object label propagation. To promote generalization, these aspects of the present disclosure train a single-frame object detector using estimated 3D bounding boxes and apply a single-frame object detector to predict 3D bounding boxes on the same set of training data. Due to the geometric similarity between moving and static objects, the single-frame object detector generates 3D bounding boxes for static objects. In some aspects of the present disclosure, the single-frame object detector is further configured to verify the consistency of temporally-adjacent bounding boxes and reject false positives for further improving robustness. The verified 3D bounding boxes for static objects are added to the training set to train another single-frame object detector from scratch, for example, as shown in FIG. 6E. This procedure may be repeated (e.g., two times), yielding a single-frame object detector that reasonably generalizes to moving and static objects.

The goal of label propagation is generating 3D bounding boxes for static objects using distilled knowledge regarding the appearance of moving objects. Consequently, some aspects of the present disclosure apply a trained, single-frame object detector to all training point clouds, for example, as shown in FIG. 6E. To further enforce consistency, the bounding boxes are tracked, while scanning for bounding boxes that do not move across temporally adjacent frames. Some aspects of the present disclosure connect adjacent bounding boxes under the following conditions: (1) if the adjacent bounding boxes are overlapping with an IoU greater than 0.5; (2) the translation between box centers of the adjacent bounding boxes is not more than 0.3 m; and (3) the adjacent bounding boxes are classified as the same class. These aspects of the present disclosure collect each chain of bounding boxes that are at least a predetermined number of frames long (e.g., 10 frames), and add all collected 3D bounding boxes to the training set. A process of representation learning for object detection from unlabeled point cloud sequences is further described in FIG. 9.

Figure 9:
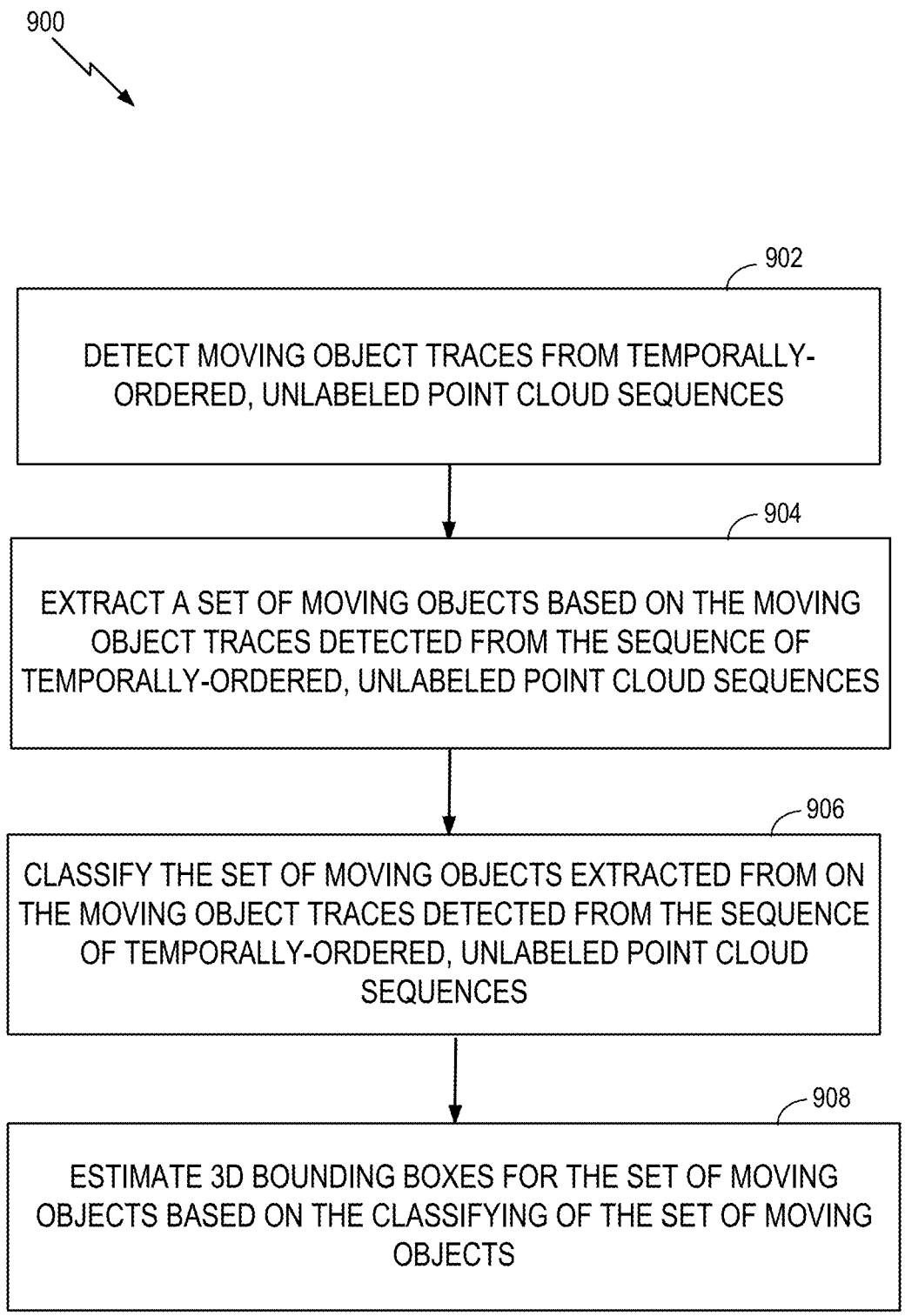
FIG. 9 is a flowchart illustrating a method of representation learning for object detection from unlabeled point cloud sequences, according to aspects of the present disclosure.

FIG. 9 is a flowchart illustrating a method of representation learning for object detection from unlabeled point cloud sequences, according to aspects of the present disclosure. The method 900 begins at block 902, in which moving object traces are detected from temporally-ordered, unlabeled point cloud sequences. For example, FIG. 5 illustrates the object trace 510 detected from temporally-ordered, unlabeled point cloud sequences. FIG. 6B illustrates the first step 602 of the process of representation learning for object detection from unlabeled point cloud sequences, in which moving object traces are detected from the input point cloud sequence 600. In this example, the first moving object trace 610, the second moving object trace 620, and the third moving object trace 630 are detected from the input point cloud sequence 600.

At block 904, a set of moving objects are extracted based on the moving object traces detected from the sequence of temporally-ordered, unlabeled point cloud sequences. For example, FIG. 6C illustrates the second step 640 for the process of representation learning for object detection from unlabeled point cloud sequences, in which detected moving object traces are used as training data. Given a set of high-quality detected object traces (e.g., the first moving object trace 610, the second moving object trace 620, and the third moving object trace 630) extracted from unlabeled, input point cloud sequence 600, self-supervised tasks are designed for enabling representation learning of point cloud models. As shown in FIG. 6C, this first pretext task trains the single-frame semantic instance segmentation model 650 to identify moving objects, according to aspects of the present disclosure.

At block 906, the set of moving objects extracted from on the moving object traces detected from the sequence of temporally-ordered, unlabeled point cloud sequences are classified. For example, FIG. 6D illustrates the third step 642 for the process of representation learning for object detection from unlabeled point cloud sequences, in which detected moving object traces are classified and bounding box inference is performed, according to aspects of the present disclosure. Aspects of the present disclosure recognize that many object classes relevant for autonomous driving are dynamic, including pedestrians, vehicles, and cyclists. In this example, the first moving object trace 610 is classified as a pedestrian, while the second moving object trace 620 and the third moving object trace 630 are classified as moving vehicles.

At block 908, 3D bounding boxes are estimated for the set of moving objects based on the classifying of the set of moving objects. For example, FIG. 6E illustrates a fourth step 660 for the process of representation learning for object detection from unlabeled point cloud sequences, in which estimated bounding boxes provide pseudo labels as training data for a single-frame object detection model 670, according to aspects of the present disclosure. These aspects of the present disclosure rely on object trace classification and bounding box inference to perform a second pretext task for training the single-frame object detection model 670 to detect 3D bounding boxes of objects in single-frame point clouds. As shown in FIG. 8C, 3D bounding boxes 860 of the pedestrian object trace 820 and 3D bounding boxes 870 of the vehicle object trace 830 are estimated from the class labels directly from each of the input object traces 800.

The method 900 may also include planning a vehicle control action of the ego vehicle according to the 3D bounding boxes identifying objects within a scene surrounding the ego vehicle. For example, as shown in FIG. 3, the representation learning and object detection system 300 may be configured for planning and control of an ego vehicle using 3D bounding boxes estimated from unlabeled point cloud sequences from frames of a LIDAR camera during operation of the ego vehicle, for example, as shown in FIG. 4.

The method 900 may extract the set of moving objects by training a single-frame semantic instance segmentation model to differentiate between feature vectors representing the set of moving objects and the feature vectors representing a background of the temporally-ordered, unlabeled point cloud sequences. The method 900 may extract the set of moving objects by identifying each of the feature vectors as a moving feature vector or a non-moving feature vector, labeling the moving object traces detected from the sequence of temporally-ordered, unlabeled point cloud sequences. The method 900 may further include training a first model to identify moving objects in a point cloud according to the labeled moving object traces. The method 900 may also include inferring attributes of the bounding boxes from the labeled moving object traces. The method 900 may further include training a second model to detect objects in the point cloud according to the attributes of the bounding boxes inferred from the labeled moving object traces.

Some aspects of the present disclosure are directed to detecting moving objects from a point cloud sequence and using information about detected moving objects to train a single-frame model for detecting objects. For example, moving objects can be detected from a point cloud sequence. A moving object can be represented as an object trace, which may be defined as a sequence of point clusters that correspond to the same object. These aspects of the present disclosure use labels to train a first model to identify moving objects in unlabeled point cloud sequences. For example, the object traces can be used as the labels. In some aspects of the present disclosure, attributes about bounding boxes can be inferred from the object traces, and these bounding boxes can be used to train a second model to detect objects in the unlabeled point cloud sequences.

In some aspects of the present disclosure, the method 900 may be performed by the system-on-a-chip (SOC) 100 (FIG. 1) or the software architecture 200 (FIG. 2) of the ego vehicle 150 (FIG. 1). That is, each of the elements of the method 900 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module (s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application-specific integrated circuit (ASIC), a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application-specific integrated circuit (ASIC) with the processor, the bus interface, the user interface, supporting circuitry, and at least a portion of the machine-readable media integrated into a single chip, or with one or more field-programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of representation learning for object detection from unlabeled point cloud sequences, comprising:
   detecting moving object traces from temporally-ordered, unlabeled point cloud sequences;
   extracting a set of moving objects based on the moving object traces detected from the sequence of temporally-ordered, unlabeled point cloud sequences;
   classifying the set of moving objects extracted from on the moving object traces detected from the sequence of temporally-ordered, unlabeled point cloud sequences;
   estimating 3D bounding boxes for the set of moving objects based on the classifying of the set of moving objects;
   labeling the moving object traces detected from the sequence of temporally-ordered, unlabeled point cloud sequences as moving vehicles; and
   planning a trajectory of an ego vehicle according to the labeled moving vehicles in a scene surrounding the ego vehicle.

2. The method of claim 1, in which the detecting moving object traces comprises:
   visualizing the temporally-ordered, unlabeled point cloud sequences in a world coordinate system according to an ego-motion;
   removing ground points from the visualizing the temporally-ordered, unlabeled point cloud sequences to form a ground removed point cloud visualization;
   estimating object cluster proposals according to a point cloud segmentation of the ground removed point cloud visualization; and
   identifying the moving object traces from the object cluster proposal according to multi-object tracing.

3. The method of claim 1, in which extracting the set of moving objects comprises:
   training a single-frame semantic instance segmentation model to differentiate between feature vectors representing the set of moving objects and the feature vectors representing a background of the temporally-ordered, unlabeled point cloud sequences; and
   identifying each of the feature vectors as a moving feature vector or a non-moving feature vector.

4. The method of claim 1, further comprises training a feature extraction module to extract the set of moving objects based on the moving object traces detected from the sequence of temporally-ordered, unlabeled point clouds via self-supervised tasks.

5. The method of claim 1, in which the set of moving objects are represented as a sequence of point clusters that correspond to corresponding one of the set of moving objects.

6. The method of claim 1, further comprising:
   training a first model to identify moving objects in a point cloud according to the labeled moving object traces;
   inferring attributes of the bounding boxes from the labeled moving object traces; and
   training a second model to detect objects in the point cloud according to the attributes of the bounding boxes inferred from the labeled moving object traces.

7. The method of claim 1, in which estimating the 3D bounding boxes comprises:
   registering the moving object traces detected from the sequence of temporally-ordered, unlabeled point cloud sequences according to object class labels; and
   assigning the 3D bounding boxes according to the object class labels.

8. The method of claim 1, further comprising controlling the ego vehicle along the planned trajectory of the ego vehicle according to the labeled moving vehicles detected in the scene surrounding the ego vehicle.

9. A non-transitory computer-readable medium having program code recorded thereon for representation learning and object detection from unlabeled point cloud sequences, the program code being executed by a processor and comprising:
  program code to detect moving object traces from temporally-ordered, unlabeled point cloud sequences;
  program code to extract a set of moving objects based on the moving object traces detected from the sequence of temporally-ordered, unlabeled point cloud sequences;
  program code to classify the set of moving objects extracted from on the moving object traces detected from the sequence of temporally-ordered, unlabeled point cloud sequences;
  program code to estimate 3D bounding boxes for the set of moving objects based on the classifying of the set of moving objects;
  program code to label the moving object traces detected from the sequence of temporally-ordered, unlabeled point cloud sequences as moving vehicles; and
  program code to plan a trajectory of an ego vehicle according to the labeled moving vehicles in a scene surrounding the ego vehicle.

10. The non-transitory computer-readable medium of claim 9, in which the program code to detect moving object traces comprises:
  program code to visualize the temporally-ordered, unlabeled point cloud sequences in a world coordinate system according to an ego-motion;
  program code to remove ground points from the visualizing the temporally-ordered, unlabeled point cloud sequences to form a ground removed point cloud visualization;
  program code to estimate object cluster proposals according to a point cloud segmentation of the ground removed point cloud visualization; and
  program code to identify the moving object traces from the estimated object cluster proposal according to multi-object tracing.

11. The non-transitory computer-readable medium of claim 9, in which the program code to extract the set of moving objects comprises:
  program code to train a single-frame semantic instance segmentation model to differentiate between feature vectors representing the set of moving objects and the feature vectors representing a background of the temporally-ordered, unlabeled point cloud sequences; and
  program code to identify each of the feature vectors as a moving feature vector or a non-moving feature vector.

12. The non-transitory computer-readable medium of claim 9, further comprises program code to train a feature extraction module to extract the set of moving objects based on the moving object traces detected from the sequence of temporally-ordered, unlabeled point clouds via self-supervised tasks.

13. The non-transitory computer-readable medium of claim 9, in which the set of moving objects are represented as a sequence of point clusters that correspond to corresponding one of the set of moving objects.

14. The non-transitory computer-readable medium of claim 9, further comprising:
  program code to train a first model to identify moving objects in a point cloud according to the labeled moving object traces;
  program code to infer attributes of the bounding boxes from the labeled moving object traces; and
  program code to train a second model to detect objects in the point cloud according to the attributes of the bounding boxes inferred from the labeled moving object traces.

15. The non-transitory computer-readable medium of claim 9, in which the program code to estimate the 3D bounding boxes comprises:
  program code to register the moving object traces detected from the sequence of temporally-ordered, unlabeled point cloud sequences according to object class labels; and
  program code to assign the 3D bounding boxes according to the object class labels.

16. The non-transitory computer-readable medium of claim 9, further comprising program code to control the ego vehicle along the planned trajectory of the ego vehicle according to the labeled moving vehicles detected in the scene surrounding the ego vehicle.

17. A system of representation learning for object detection from unlabeled point cloud sequences, the system comprising:
  a moving object trace detection module to detect moving object traces from temporally-ordered, unlabeled point cloud sequences;
  a moving object extraction module to extract a set of moving objects based on the moving object traces detected from the sequence of temporally-ordered, unlabeled point cloud sequences;
  an object classification and labeling module to classify the set of moving objects extracted from on the moving object traces detected from the sequence of temporally-ordered, unlabeled point cloud sequences;
  a bounding box estimation module to estimate 3D bounding boxes for the set of moving objects based on the classifying of the set of moving objects, and to label the moving object traces detected from the sequence of temporally-ordered, unlabeled point cloud sequences as moving vehicles; and
  a planner to plan a trajectory of an ego vehicle according to the labeled moving vehicles in a scene surrounding the ego vehicle.

18. The system of claim 17, further comprising a single-frame semantic instance segmentation model trained to differentiate between feature vectors representing the set of moving objects and the feature vectors representing a background of the temporally-ordered, unlabeled point cloud sequences and to identify each of the feature vectors as a moving feature vector or a non-moving feature vector.

19. The system of claim 17, in which the set of moving objects are represented as a sequence of point clusters that correspond to corresponding one of the set of moving objects.

20. The system of claim 17, further comprising a controller to control the ego vehicle along the planner trajectory of the ego vehicle according to the 3D bounding boxes detected in the scene surrounding the ego vehicle.

* * * * *